United States Patent [19]

Carney

[11] 4,252,655
[45] Feb. 24, 1981

[54] SCAVENGING HYDROGEN SULFIDE IN AN OIL WELL

[75] Inventor: Leroy L. Carney, New Caney, Tex.

[73] Assignee: Halliburton Company, Duncan, Okla.

[21] Appl. No.: 896,221

[22] Filed: Apr. 17, 1978

Related U.S. Application Data

[63] Continuation-in-part of Ser. No. 799,857, May 23, 1977, abandoned.

[51] Int. Cl.$^3$ .......................... C09K 7/02; C23F 11/10
[52] U.S. Cl. .................................. 252/8.5 C; 175/64; 210/749; 252/8.5 A; 252/8.5 M; 252/8.55 E; 252/389 R
[58] Field of Search .............. 252/8.5 A, 8.5 B, 8.5 C, 252/8.55 E; 175/64; 210/59

[56] References Cited

U.S. PATENT DOCUMENTS

| | | | |
|---|---|---|---|
| 3,107,739 | 10/1963 | Mathews | 252/8.5 X |
| 3,301,323 | 1/1967 | Parsons | 175/64 |
| 3,431,202 | 3/1969 | Van Blaricom et al. | 252/8.5 |
| 3,506,572 | 4/1970 | Van Dyke et al. | 252/8.5 |
| 3,580,934 | 5/1971 | Murray et al. | 252/389 |
| 3,699,042 | 10/1972 | Browning et al. | 252/8.5 |
| 3,928,211 | 12/1975 | Browning et al. | 252/8.5 |

OTHER PUBLICATIONS

Chaber et al., Organic Sequestering Agents, Pub. by John Wiley and Sons, New York, pp. 1-15, 210, 211 and 511-585.

Sheppard, Pipeline Corrosion, Article in World Oil, Jun. 1949, pp. 193, 194, 198 and 202.

*Primary Examiner*—Herbert B. Guynn
*Attorney, Agent, or Firm*—John H. Tregoning; Bob Nisbett

[57] ABSTRACT

Fluids for drilling, completing or servicing wells are treated for the removal or inactivation of hydrogen sulfide contamination by the addition of at least one organic zinc chelate.

16 Claims, No Drawings

SCAVENGING HYDROGEN SULFIDE IN AN OIL WELL

This is a continuation-in-part of application Ser. No. 799,857 filed May 23, 1977, now abandoned.

The invention of this application relates to the removal or inactivation of hydrogen sulfide or soluble sulfide ion contamination which is frequently encountered in wells which penetrate subterranean formations such as oil wells, gas wells and the like. Fluids in sewage systems, fluids produced from wells and make-up fluids also frequently contain hydrogen sulfide. By this invention, these fluids can be pretreated prior to any hydrogen sulfide encounter or treated to remove hydrogen sulfide contamination after it has occurred. Removal or inactivation of this sulfide ion is necessary to prevent poisoning of surrounding personnel, contamination of the area and excessive corrosion of steel pipe and tools used in the well.

In the practice of this invention, the organic zinc chelate is merely added to the drilling fluid which is preferably an aqueous dispersed or nondispersed fluid. The drilling fluid can also be an oil base or emulsion fluid. The oil can be any normally liquid hydrocarbon such as aliphatic hydrocarbon, an aromatic hydrocarbon or mixtures thereof. The fluid is typically circulated in the well during drilling and other operations so that the concentration of organic zinc chelate should be monitored to maintain a certain concentration, preferably from about several parts per million (ppm) to several percent, depending on the possibility of encountering hydrogen sulfide. Normally, a concentration of up to about five pounds per barrel (ppb) of fluid will be sufficient. The fluid should also be monitored to indicate the presence of any hydrogen sulfide or sulfide ions which would indicate the needed addition of organic zinc chelate or a need to increase the level of concentration of the organic zinc chelate in the fluid. As a safeguard where hydrogen sulfide is not likely to be a severe problem, chelate concentrations of about 0.25 to 0.5 ppb should be used to scavenge out trace amounts of sulfides that may not be detected by tests on the surface.

It has been discovered that certain organic chelates effectively remove or inactivate hydrogen sulfide or soluble sulfide ion present in most well fluids and especially in water base drilling fluids. More importantly, the organic zinc chelates not only remove the hydrogen sulfide but do so without adversely affecting rheological properties of the fluid such as thickening or gelling the mud or increasing fluid loss significantly. In drilling, completing or servicing a well this is significant because it is essential to maintain circulation and control of the well when hazardous conditions, such as hydrogen sulfide, are encountered. The particular organic zinc chelates of this invention are unique in that the zinc is combined with the organic chelant so that the combination has an ionization or stability constant which prevents formation of insoluble zinc hydroxide which would prevent reaction of the zinc ion with sulfide or make the zinc ion unavailable for reaction with the hydrogen sulfide. Furthermore, the stability constant is such that formation of highly soluble salts which would adversely affect the rheology of the well fluid and thus control of the well are prevented.

The organometallic zinc chelates of this invention require the use of certain types of organic chelating agents. These chelating agents sequester zinc ions so that formation of insoluble compounds such as zinc hydroxide and zinc oxide are prevented. Furthermore, the zinc chelates have a constant which prevents formation of soluble zinc compounds in which the zinc is ionized and would thus readily form zinc ions and adversely affect rheology of the well fluid such as by flocculating clays in the mud. These preferred chelating agents are a relatively simple, low molecular weight hydrocarbon base material containing acetic or nitrogen functional groups with a stability constant in the range of about 10–16 as described by Chaber Martell in *Organic Sequestering Agents*. The preferred chelants are relatively simple aliphatic amine acids or salts having at least one tertiary amino group and more than two carboxyl groups or salts. In addition, the chelates should contain at least about 10% zinc by weight. The preferred chelates contain about 15% to 25% zinc. The preferred chelates can be blended as concentrates and added directly to the drilling fluid or premixed with water and then added to the drilling mud. It has been found that zinc chelates with a stability constant outside of this range of about 10–16 are not effective for removing soluble sulfide ion or adversely affect rheology of the well fluid. The following are examples of organic zinc chelates, with the stability constant in parenthesis, which can be used are dithiotartaric acid (15.82); triethylene tetramine (12.1); ethylene-bis-alpha,alpha'-(2-amino methyl)-pyridene (11.5); B,B',B'' triaminotriethylamine (14.65); tetrakis (2-amino-ethyl)-ethylene diamine (16.24); alpha,B,-diamino propionic acid (11.5); B-mercaptoethyliminodiacetic acid (15.92); ethylene diamine-N, N'-diacetic acid (11.1); ethylene diamine-N, N-diacetic acid (11.93); ethylene-bis-N, N'-(2-(aminomethyl)-pyridene N-N'-diacetic acid (15.2); N-hydroxy ethylethylene diamine triacetic acid (HEDTA) (14.5); ethylene diamine N,N'-dipropionic-N-N'-diacetic acid (14.5); hydroxy acetic acid; and nitrilotriacetic acid (NTA) (10.45). The preferred organo chelating agent is the NTA which is especially effective for reacting with or absorbing high ratios of hydrogen sulfide with little or no adverse effect on the drilling fluid rheology. The other chelants with structures similar to NTA and a stability constant near that of NTA are more effective under typical drilling conditions.

Zinc is preferred as the metallic ion to react with the sulfide because of the particular stability constant range and the compatibility with drilling fluid rheology. The zinc ion is particularly effective for reacting with the soluble sulfide or the sulfide ion to prevent stress cracking of steel tubing and tools used in the well and to prevent escape of the hydrogen sulfide which would act as a poison to personnel and environment surrounding the well. The sequestered zinc ion as described for this invention effectively precipitates the sulfide ion in the well fluid. Zinc effectively stops stress cracking of ferrous metals without plating out on the metal and causing galvanic corrosion. Furthermore, zinc does not cause stress cracking through secondary oxygen reactions. This zinc sulfide precipitate does not adversely affect the well fluid rheology and can be readily removed by conventional methods such as centrifuging, filtering or settling in the mud pits. The zinc NTA chelate is also preferred because it is effective over a wide pH range and reacts practically instantaneously with its addition to the drilling fluid to effectively inactivate the hydrogen sulfide to prevent stress cracking of metals and liberation of hydrogen sulfide at the surface. Other agents for removing hydrogen sulfide require a period for digestion or effective reaction with the hydrogen sulfide, indicating that at least a delayed reaction occurs. Many known hydrogen sulfide compounds are also very sensitive to factors such as concentration and pH. Furthermore, known agents and the reaction products adversely affect rheology of the well fluid. The organo zinc chelates used for this invention are effective over a wide pH range of about 5–12 but are preferably used in the range of about 6–11. The organo zinc chelates of this invention can be used alone or in conjunction with conventional well fluid additives, even other sulfide scavenging materials. The organo zinc chelates of this invention can effectively remove hydrogen sulfide concentrations from only trace amounts like one ppm up to large amounts such as thousands of ppm or more by simply adding the amount of chelate needed to stoichiometrically react with the sulfide. The organo zinc chelate of this invention should be present in the well fluid as a safety factor in a concentration of at least about 0.25–0.5 ppb (1,258–2,516 gm/l).

The organo zinc chelate of this invention can be added to the well fluid as a previously prepared organo zinc chelate either in liquid or dry powder form. Furthermore, the organo zinc chelate of this invention can be formed in the well fluid in situ by merely adding a water soluble zinc compound and the organic chelant in the desired ratio. The organic chelant should be combined with the soluble zinc ion in a certain weight ratio depending on its sequestering ability. For NTA and similar chelants the range is about 4:1 to 99:1 and preferably in the ratio of about 4:1 to 9:1. Preferred soluble zinc compounds for forming the organo zinc chelate include zinc sulfate, zinc chloride or any readily available soluble zinc compound. The zinc compound can contain an ion such as acetate, sulfate, ammonium, bromate, bromide, chlorate, chloride, formate, iodide, nitrate, silicofluoride, sulfoxylate or hydrosulfite.

For certain applications where hydrogen sulfide and corrosion from oxygen are both problems, the zinc is preferably added to the drilling fluid as zinc hydrosulfite suspended in a liquid organic carrier. The zinc hydrosulfite preferably has a fine particle size for easier suspension and faster reaction rate. The zinc hydrosulfite should be largely pure zinc hydrosulfite, e.g. at least about 80% pure, but other zinc compounds and other hydrosulfite compounds may be in the zinc hydrosulfite.

The carrier fluid for the zinc hydrosulfite is preferably an organic liquid. It can be an aliphatic, aromatic or substituted hydrocarbon or mixtures thereof as long as the carrier liquid is substantially nonreactive with zinc hydrosulfite, oxygen, hydrogen sulfide or most common well fluid additives. The organic liquid carrier fluid should have a viscosity sufficient to suspend the zinc hydrosulfite and any other additives such as at least about five centipoise. To obtain the desired viscosity nonreactive thickeners such as silica or polymers can be used. Also other additives to change pour point, flammability, volatility, color, etc. can be used. Preferred carriers include mineral oils, diesel and kerosene. The zinc hydrosulfite is present in the carrier in a concentration of about 10–90% by weight and preferably about 15–75%. Emulsifiers, surfactants or dispersing agents can also be used to modify dispersion characteristics of the slurry. The zinc hydrosulfite slurry can be used in aqueous fluids, oil base or emulsion fluids which are used as packer fluids or well fluids.

Less soluble compounds such as zinc carbonate or basic zinc carbonate can be used to prepare the chelate but longer reaction times are necessary. To use less soluble zinc compounds, the chelates should be preblended and separated from the anion. The anion of the compound used to supply the zinc ion for the chelant must be controlled to prevent adverse effects. For example, if zinc carbonate is used, the chelate should be preblended and purified by removing the carbonate since the carbonate ion flocculates clays encountered in drilling fluids.

For oil base mud or oil external emulsion fluids a preferred hydrogen sulfide scavenger is basic zinc carbonate. This scavenger material can be added directly to the drilling fluid as a finely divided particulate material or suspended in a slurry using a liquid organic carrier as described above. For oil external emulsion fluids the scavenger can be suspended in an aqueous or an organic liquid carrier. The basic zinc carbonate should be suspended in the carrier fluid in concentrations of about 10–90% by weight and preferably 15–75%. Other additives can be used to modify carrier fluid properties such as viscosity, flammability, volatility, color, etc. as indicated herein. An oil base mud or fluid is one containing at least one oil or organic liquid phase such as a normally liquid hydrocarbon.

The chelate can also be formed in situ in the fluid; however, the chelant and soluble zinc compound should be added together and mixed so that zinc ion does not precipitate the clays and the chelant is not adsorbed on solid particles. The chelant should be added in excess. For drilling fluids with high solids concentrations the chelant and zinc or chelant blend should be added slowly and thoroughly mixed with the drilling fluid before it is circulated into the well.

The preparation and use of the organometallic chelates of this invention should be apparent to one skilled in the art in view of this disclosure. The following references are cited and incorporated herein by reference:

U.S. Pat. No. 2,801,994 to Gray
U.S. Pat. No. 3,099,874 to Chisholm
U.S. Pat. No. 3,107,739 to Mathews
U.S. Pat. No. 3,146,199 to Salathiel et al
U.S. Pat. No. 3,431,202 to VanBlaricom et al
U.S. Pat. No. 3,441,504 to Browning et al
U.S. Pat. No. 3,462,239 to Swanson et al
U.S. Pat. No. 3,506,572 to VanDyke et al
U.S. Pat. No. 3,578,508 to Pearlman
U.S. Pat. No. 3,580,934 to Murray et al
U.S. Pat. No. 3,669,613 to Knox et al
U.S. Pat. No. 3,697,498 to Browning et al
U.S. Pat. No. 3,699,042 to Browning et al
U.S. Pat. No. 3,810,882 to Browning et al
U.S. Pat. No. 3,928,211 to Browning et al
U.S. Pat. No. 4,000,083 to Heesen
U.S. Pat. No. 3,059,533 to Watson et al Stanley Chaber and Arthur E. Martell, *Organic Sequestering Agents*, John Wiley & Sons, Inc., New York.

Lars Gunnar Sillen and Arthur E. Martell, *Stability Constants Of Metal-Ion Complexes*, Metcalfe & Cooper Limited, London, 1964.

K. B. Yatsimirskii and V. P. Vasil'ev, *Instability Constants Of Complex Compounds*, Consultants Bureau, New York, 1960.

These references show prior scavengers, methods of preparing various chelants and practices of the drilling mud art.

EXAMPLES

Samples were tested for reaction with hydrogen sulfide ($H_2S$) in a standard water base drilling fluid (pH=9.0). The treatment level for the additives was calculated to give the same molar concentration of zinc metal in all samples tested. Hydrogen sulfide was generated from 0.1 M sodium sulfide ($Na_2S$) with sulfuric acid and the $H_2S$ was bubbled into the drilling fluid sample in a Waring blender. For each 100 ml of 0.1 M $Na_2S$ used, 970 ppm of $H_2S$ was generated for reaction in the drilling fluid. Hydrogen sulfide was bubbled through the sample until $H_2S$ emission was detected by lead acetate paper indicating saturation of the mud with $H_2S$.

The effect of the additive on stress cracking was evaluated using prestressed steel bearings in various drilling fluids at 150° F. with rolling; i.e., aging or hot rolling the sample for a designated period of time.

The majority of the chelates that were synthesized involved the following steps:

1. Equimolar quantities of the chelating agent and zinc salt were stirred in a minimum amount of water for 30 minutes.
2. The solution was basified (pH 8–9) with KOH.
3. Absolute ethanol was added to precipitate the chelates, which were filtered and dried.

The stability of the organometallic chelates of lead, zinc, and copper vary according to the metal, chelating agent, pH, etc. With the zinc metal ion chelated by nitrilotriacetic acid (NTA), the compounds had little detrimental effect on the drilling fluid properties. Hydrogen sulfide reacts readily with the Cu, Pb, and Zn chelates of NTA, precipitating the sulfide ion as insoluble CuS, PbS or ZnS. Although these compounds are very effective $H_2S$ scavengers, only the ZnNTA also prevents sulfide stress cracking of prestressed steel bearings and has no detrimental effects on the drilling mud. In fact, the bearings placed in mud treated with PbNTA and CuNTA often crack before the bearings in untreated mud.

The zinc lignosulfonates containing zinc are effective in preventing stress cracking in bearings. However, foaming is a severe problem and the zinc concentration is very low in this chelate.

Inorganic compounds of zinc (sodium zincate) and lead (sodium plumbite) are effective $H_2S$ scavengers. Yet, these compounds fail to prevent sulfide stress cracking of bearings in treated mud.

The samples were tested as described above. The water base mud samples were formulated as follows based on a 42-gallon barrel containing water with the following additives: 0.9 ppb NaCl, 1.75 ppb $CaCO_3$, 16 ppb Wyoming bentonite, 28 ppm Southern bentonite, 4 ppb chrome lignosulfonate dispersant and a fluid loss additive. The pH was adjusted to 9.0 with NaOH. Various chelates and $H_2S$ scavenging agents were added in the quantities with the test results as indicated in the table. One ppb is one pound per 42-gallon barrel of total fluid and is equal to one gram per 350 milliliters of fluid or about 3 grams per liter of fluid.

Rheology, fluid loss and pH for each sample was measured using a Fann type direct reading viscometer, fluid loss cell or pH meter according to API Method 13B.

Zinc NTA blends were prepared by reacting sodium NTA ($NTANa_3$) with each of the following: $ZnCl_2$ and $ZnSO_4$. These blends were tested both as slurries and as oven-dried solids. The tests indicate that these blends gave acceptable results in preventing stress cracking of steel bearings; however, preblended and purified ZnNTA gave the best results.

TABLE 1

Identification of Samples (Tables 2–11)

Each sample was a 350-milliliter portion of water base mud with or without the amount of additives or treatment indicated.

| Sample No. | Description |
|---|---|
| 1, 3, 6, 8, 10, 12 | Water Base Mud |
| 2, 9, 11, 13 | 2.86 ppb ZnNTA, zinc nitrilotriacetic acid salt |
| 4 | 24 ppb of 15% zinc lignosulfonate solution |
| 5 | 3.98 ppb zinc ethylene diamine tetraacetic acid salt (ZnEDTA) |
| 7 | 1.12 ppb basic zinc carbonate ($ZnCO_3$) |
| 14, 19 | 2 ppb ZnNTA |
| 15 | Base Mud with $H_2S$ treatment |
| 16 | 2 ppb $ZnCO_3$ |
| 17 | Base Mud without $H_2S$ |
| 18 | Base Mud with $H_2S$ |
| 20 | 2 ppb copper carbonate ($CuCO_3$) |
| 21 | 2 ppb ZnEDTA |
| 22 | 2 ppb ZnDET (diethylene triamine) |
| 23 | 2 ppb Zn TETA (triethylene tetraamine) |
| 24 | Standard base mud with 1 ppb sulfides or 2,494 ppm sulfides. Aging by hot rolling at 150° F. for 16 hours. This base mud contains 4.5 ppb VC-10 chrome lignosulfonate dispersant. |
| 25 | Same as Sample 24 with 2.08 ppb basic Zn carbonate containing 45% zinc. |
| 26 | Same as Sample 24 with 8.66 ppb ZnNTA containing 21% zinc. |
| 27 | Standard base mud without sulfide |
| 28 | Same as Sample 24 with 8.6 ppb $ZnSO_4$ and $Na_3NTA$ mixture containing 21% zinc. |
| 29 | Standard base mud same as Sample 24 without sulfides. |
| 30 | Same as Sample 29 with 5 ppb of a mixture of 35:65 weight ratio of $ZnSO_4$:$Na_3NTA$. |
| 31 | Same as Sample 30 with the ratio of 40:60. |
| 32 | Same as Sample 30 with the ratio of 45:55. |
| 33 | Same as Sample 30 with the ratio of 50:50. |

TABLE 2

EFFECT OF ADDITIVE ON RHEOLOGY AND REACTION WITH HYDROGEN SULFIDE

| | Initial Rheology and $H_2S$ Uptake | | | | | | |
|---|---|---|---|---|---|---|---|
| | Set 1 | | Set 2 | | | Set 3 | |
| Sample No. | 1 | 2 | 3 | 4 | 5 | 6 | 7 |
| Apparent Viscosity | 19.5 | 16.5 | 19.5 | 47.5 | 28.5 | 21.5 | 21.0 |
| 600 Reading | 39 | 33 | 39 | 95 | 57 | 43 | 42 |
| 300 Reading | 24 | 20 | 26 | 72 | 40 | 28 | 27 |
| Plastic Viscosity (PV) | 15 | 13 | 13 | 23 | 17 | 15 | 15 |

TABLE 2-continued
EFFECT OF ADDITIVE ON RHEOLOGY AND REACTION WITH HYDROGEN SULFIDE

| | Initial Rheology and H$_2$S Uptake | | | | | | |
|---|---|---|---|---|---|---|---|
| | Set 1 | | Set 2 | | | Set 3 | |
| Sample No. | 1 | 2 | 3 | 4 | 5 | 6 | 7 |
| Yield Point (YP) | 9 | 7 | 13 | 49 | 23 | 13 | 12 |
| Gel Strength (10 sec.) | 3 | 3 | — | — | — | 5 | 4 |
| Gel Strength (10 min.) | — | — | — | — | — | 23 | 27 |
| Vol. of 0.1 M Na$_2$S (ml) absorbed | 15 | 217 | 12 | * | 52** | 14 | 24 |
| Final Temp. °F. | 80 | 102 | 86 | — | — | 80 | 90 |
| Final pH | — | — | 8.1 | 6.5 | 8.1 | — | — |

*Foamed
**Gelled

Samples 3, 4 and 5 show that zinc lignosulfonate and zinc ethylene diamine tetraacetic acid salt (ZnEDTA) caused excess foaming and gelation of the drilling fluid.
Samples 6 and 7 show that basic zinc carbonate has a very low reactive capacity for H$_2$S.

TABLE 3
RHEOLOGY AFTER REACTION WITH H$_2$S

| | Set 1 | |
|---|---|---|
| Sample No. | 1 | 2 |
| Apparent Viscosity | 18.5 | 17.5 |
| 600 Reading | 37 | 35 |
| 300 Reading | 22 | 21 |
| Plastic Viscosity (PV) | 15 | 14 |
| Yield Point (YP) | 7 | 7 |
| Gel Strength (10 sec.) | 4 | 4 |
| Gel Strength (10 min.) | 12 | 25 |
| API Filtrate (ml/30 min.) | 8 | 8 |

These tests show that the ZnNTA chelate had a high reactive capacity for H$_2$S with good rheology and fluid loss.

TABLE 4
INITIAL RHEOLOGY AND FLUID LOSS

| | Set 1 | |
|---|---|---|
| Sample No. | 8 | 9 |
| Apparent Viscosity | 18 | 16.5 |
| 600 Reading | 36 | 33 |
| 300 Reading | 23 | 20 |
| Plastic Viscosity (PV) | 13 | 13 |
| Yield Point (YP) | 10 | 7 |
| Gel Strength (10 sec.) | 3 | 6 |
| Gel Strength (10 min.) | 14 | 38 |
| API Filtrate (ml/30 min.) | 7.1 | 6.4 |

TABLE 5
RHEOLOGY AND FLUID LOSS AFTER HOTROLLING 16 HOURS AT 150° F.

| | Set 1 | |
|---|---|---|
| Sample No. | 8 | 9 |
| Apparent Viscosity | 18.5 | 19.5 |
| 600 Reading | 37 | 39 |
| 300 Reading | 22 | 22 |
| Plastic Viscosity (PV) | 15 | 17 |
| Yield Point (YP) | 7 | 5 |
| Gel Strength (10 sec.) | 3 | 3 |
| Gel Strength (10 min.) | 9 | 3 |
| API Filtrate (ml/30 min.) | 6.6 | 7.6 |

These tests show that drilling fluid with ZnNTA has good rheology and fluid loss after aging or hotrolling.

TABLE 6
INITIAL RHEOLOGY

| | Set 2 | | Set 4 | |
|---|---|---|---|---|
| Sample No. | 10 | 11 | 12 | 13 |
| Apparent Viscosity | 22 | 22.5 | 18 | 19 |
| 600 Reading | 44 | 45 | 36 | 38 |
| 300 Reading | 37 | 39 | 22 | 25 |
| Plastic Viscosity | 7 | 6 | 14 | 13 |
| Yield Point (YP) | 30 | 33 | 8 | 12 |
| Gel Strength (10 sec.) | 5 | 17 | 6 | 13 |
| Gel Strength (10 min.) | 14 | 82 | 27 | 58 |

TABLE 7
RHEOLOGY, FLUID LOSS, AND H$_2$S UPTAKE AFTER HOTROLLING 16 HOURS AT 325° F.

| | Set 2 | |
|---|---|---|
| Sample No. | 10 | 11 |
| Apparent Viscosity | 46.5 | 38 |
| 600 Reading | 93 | 76 |
| 300 Reading | 62 | 59 |
| Plastic Viscosity (PV) | 31 | 17 |
| Yield Point (YP) | 31 | 42 |
| Gel Strength (10 sec.) | 14 | 4 |
| Gel Strength (10 min.) | 244 | 45 |
| API Filtrate (ml/30 min.) | 12.7 | 13.5 |
| Vol. of 0.1 M Na$_2$S (ml) absorbed | 19 | 116 |

These tests show that drilling mud with ZnNTA has good rheology and fluid loss after reacting with H$_2$S and aging.

TABLE 8
RHEOLOGY AND H$_2$S UPTAKE AFTER AGING FOR 8 DAYS AT 78° F.

| | Set 4 | |
|---|---|---|
| Sample No. | 12 | 13 |
| Apparent Viscosity | 19 | 23.5 |
| 600 Reading | 38 | 47 |
| 300 Reading | 24 | 29 |
| Plastic Viscosity (PV) | 14 | 18 |
| Yield Point | 10 | 11 |
| Gel Strength (10 sec.) | 4 | 5 |
| Gel Strength (10 min.) | 21 | 26 |
| Vol. of 0.1 M Na$_2$S (ml) absorbed | 22 | 60 |

These tests show that drilling mud with ZnNTA has good rheology after heat aging for extended periods with H$_2$S reaction.

TABLE 9

| | Set 1 - Rolled 16 Hours |
|---|---|
| Sample No. | Description of Bearing |
| 14 | Medium dark; rough surface; no cracks |
| 15 | Dark; smooth surface; cracked |

TABLE 9-continued

| 16 | Dark; smooth surface; cracked |
|---|---|
| Set 2 - Rolled 5 hours with 2 Bearings | |
| 20 | Dark color; one cracked |
| 21 | Black; no cracks |
| 22 | Black; no cracks |
| 23 | Dark; no cracks |
| Set 2 - Rolled 22 Hours | |
| 17 | Both black and cracked |
| 18 | Both black and cracked |
| 19 | Both dark; no cracks |
| 20 | Copper coated; cracked |
| 21 | Both black; one cracked |
| 22 | Both black; one cracked |
| 23 | Both black; one cracked |

TABLE 10

| | Sulfide Scavengers | | | | | | | | | |
|---|---|---|---|---|---|---|---|---|---|---|
| | Effectiveness Comparison | | | | | | In Situ Formation | | | |
| | 24 | | 25 | | 26 | | 27 | | 28 | |
| Sample No. | Initial | Aging | Initial | Aging | Initial | Aging | Initial | Aging | Initial | Aging |
| Apparent Viscosity | 8 | 11 | 12 | 10 | 18 | 15 | 13 | — | 22 | 15 |
| 600 RPM | 15 | 22 | 21 | 20 | 33 | 30 | 26 | — | 44 | 29 |
| 300 RPM | 8 | 11 | 12 | 12 | 25 | 16 | 18 | — | 30 | 17 |
| Plastic Viscosity | 7 | 11 | 9 | 8 | 8 | 14 | 8 | — | 14 | 12 |
| Yield Point (#/100 ft.$^2$) | 1 | 0 | 3 | 4 | 17 | 2 | 10 | — | 16 | 5 |
| Initial Gel | 1 | 1 | 1 | 1 | 3 | 1 | 8 | — | 7 | 2 |
| 10 Min. Gel | 4 | 3 | 20 | 4 | 65 | 15 | 31 | — | 82 | 50 |
| pH | 12.4 | 11.2 | 12.3 | 11.0 | 12.2 | 10.8 | — | — | 12.0 | — |
| H$_2$S Remaining | 1800 | 1080 | 1800 | <1.0 | 15 | 13 | — | — | — | — |
| Sulfides Remaining | — | — | — | — | — | — | — | — | 10 | 3-4 |

TABLE 11

| | Ratio of Zinc to Chelant | | | | | | | | | |
|---|---|---|---|---|---|---|---|---|---|---|
| Sample No. | 29 | | 30 | | 31 | | 32 | | 33 | |
| | Initial | Aging | Initial | Aging | Initial | Aging | Initial | Aging | Initial | Aging |
| Apparent Viscosity | 16 | 12 | 16 | 15 | 20 | 15 | 23 | 16 | 31 | 16 |
| 600 RPM | 32 | 24 | 33 | 30 | 40 | 30 | 47 | 32 | 62 | 33 |
| 300 RPM | 20 | 14 | 21 | 16 | 25 | 17 | 32 | 19 | 49 | 20 |
| Plastic Viscosity | 13 | 10 | 12 | 14 | 15 | 13 | 15 | 13 | 13 | 13 |
| Yield Point (#/100 ft.$^2$) | 7 | 4 | 9 | 2 | 10 | 4 | 17 | 6 | 36 | 17 |
| Initial Gel | 4 | 1 | 2 | 1 | 8 | 1 | 13 | 1 | 22 | 2 |
| 10 Min. Gel | 90 | 3 | 109 | 5 | 144 | 10 | 187 | 20 | 239 | 28 |
| pH | — | 8.9 | — | 8.5 | — | 8.5 | — | 8.6 | — | 8.6 |

Table 10, Samples 24 through 26, show that ZnNTA effectively removes H$_2$S from the drilling mud quickly and for an extended period of time with good rheology of the mud. ZnNTA reduces the sulfide ion concentration practically instantaneously as compared to the basic ZnCO$_3$.

Samples 27 and 28 of Table 10 show that the ZnNTA chelate can be formed in situ and react practically instantaneously to remove sulfide ion. The ZnNTA reduces the sulfide ion concentration to only trace amounts.

Table 11, Samples 29 through 33, show that high ratios of zinc ion to NTA produces higher gel strength or higher viscosity and yield point at the high additive concentration of 5 ppb. The weight ratio of zinc ion to NTA should be present in a molecular excess compared to the zinc ion.

EXAMPLE (Samples 34–40)

A base mud was prepared using 350 milliliters (ml) deionized water, 88 gm salt, 10 gm attapulgite clay, 5 gm starch and 0.25 gm sodium hydroxide caustic for each sample. To three samples, portions of ammonium bisulfite (NH$_4$HSO$_3$), as a 60% solution in water, was added and recorded as pounds per 42 gallons per barrel (ppb) or gm per 350 ml sample. To three other samples portions of zinc hydrosulfite, as a 30% slurry in white oil was added and recorded ppb which is equivalent to gm per 350 ml sample. The pH of several samples was measured and adjusted using caustic. Fourteen ml of sodium sulfide solution was added to each sample at a concentration of 187.5 gm Na$_2$S.8H$_2$O per 1000 ml of solution in deionized water. Fourteen milliliters were equivalent to 1000 ppm H$_2$S in 350 mililiters of mud. The resulting pH and H$_2$S present was measured. The H$_2$S concentration was measured in API filtrate using a Garrett gas train. After hot rolling the samples in an oven at 150° F. for 16 hours with the pH and H$_2$S concentration were again measured.

Measured properties of the samples are tabulated as Table 12:

TABLE 12

| Sample | 34 | 35 | 36 | 37 | 38 | 39 | 40 |
|---|---|---|---|---|---|---|---|
| NH$_4$HSO$_3$ (gm or ppb) | Base Mud | 1 | 2 | 4 | — | — | — |
| Zn hydrosulfite (gm or ppb) | — | — | — | — | 1 | 2 | 4 |
| pH (before NaOH) | — | — | 6.0 | 5.6 | — | — | — |
| Caustic (gm or ppb) | — | — | 0.25 | 0.75 | — | — | — |
| pH (after NaOH) | — | — | 7.4 | 7.6 | — | — | — |
| pH (after Na$_2$S) | 11.6 | 10.4 | 9.6 | 9.3 | 11.4 | 11.1 | 7.7 |
| H$_2$S (ppm) | 960 | 550 | 400 | 250 | 400 | 640 | 100 |
| | | | After Hot Rolling | | | | |
| pH | 11.1 | 10.3 | 9.7 | 9.1 | 11.1 | 10.9 | 9.2 |

TABLE 12-continued

| Sample | 34 | 35 | 36 | 37 | 38 | 39 | 40 |
|---|---|---|---|---|---|---|---|
| $H_2S$ (ppm) | 480 | 300 | 175 | 25 | 340 | 120 | trace |

TABLE 13
(Samples 41–43)

| | Sample 41 | | Sample 42 | | Sample 43 | |
|---|---|---|---|---|---|---|
| | Initial | After Test | Initial | After Test | Initial | After Test |
| Scavenger | | $NH_4HSO_3$ | | Zn Hydrosulfite | | $Na_2SO_3$ |
| Fann Viscosity | | | | | | |
| 600 RPM | 26 | 16 | 22 | 18 | 25 | 28 |
| 300 RPM | 16 | 10 | 14 | 11 | 15 | 19 |
| Apparent Viscosity (AV) | 13 | 8 | 11 | 9 | 12.5 | 14 |
| Plastic Viscosity (PV) | 10 | 6 | 8 | 7 | 10 | 9 |
| Yield Point (YP) | 6 | 4 | 6 | 4 | 5 | 10 |
| Gel Strength, Initial | 3 | 1 | 2 | 1 | 2 | 6 |
| Gel Strength, 10 min. | 22 | 1 | 19 | 2 | 22 | 31 |
| pH | 11.6 | 6.5 | 11.3 | 7.5 | 11.3 | 10.5 |
| Temp. °C. | 24 | 24 | 24.5 | 23 | 23 | |
| $O_2$ Conc. (ppm) | 7.8 | — | 8.2 | — | 8.3 | — |

EXAMPLE (Sample 41)

A polymer type aqueous base mud was prepared using the following recipe based on grams (gm) per a 350 milliliter (ml) sample which is proportional to pounds per 42-gallon barrel (ppb):

350 ml—deionized water
12 gm—bentonite clay
0.05 gm—polyvinyl acetate-maleic anhydride copolymer bentonite extender
0.5 gm—AMOCO Drillaid 425 polyacrylamide polymer
0.25 gm—NaOH caustic The properties of this mud Sample 41 were measured before aerating using air passed through a Garrett gas train dispersion tube and adding ammonium bisulfite (60% in water) dropwise to the mud. The measured and calculated properties are tabulated in Table 13.

After measuring the initial properties the ammonium solution was added dropwise to Sample 41 at 3 drops per 60 seconds with stirring (one drop=0.027933 gm of $NH_4HSO_3$) and the oxygen concentration in ppm was recorded. After twenty minutes, addition of the $NH_4HSO_3$ solution resumed. Recorded values for drops of solution added, oxygen concentration as measured by a YSI oxygen meter in parts per million (ppm) and time in minutes are as follows:

TABLE 14

| Time | Drops | $O_2$ ppm | Time | Drops | $O_2$ ppm |
|---|---|---|---|---|---|
| 0 | 0 | 7.8 | 19:00 | 57 | 0.07 |
| 1:00 | 3 | 7.5 | 20:00 | 60 | 0.07 |
| 2:00 | 6 | 7.0 | 21:00* | — | 0.70 |
| 3:00 | 9 | 6.4 | 22:00* | — | 0.80 |
| 4:00 | 12 | 5.8 | 23:00* | — | 2.00 |
| 5:00 | 15 | 5.0 | 24:00* | — | 1.85 |
| 6:00 | 18 | 3.7 | 25:00* | — | 1.75 |
| 7:00 | 21 | 0.9 | 26:00 | — | 1.60 |
| 8:00 | 24 | 0.45 | 27:00 | 63 | 1.40 |
| 9:00 | 27 | 0.33 | 28:00 | 66 | 0.55 |
| 10:00 | 30 | 0.25 | 29:00 | 69 | 0.43 |
| 11:00 | 33 | 0.20 | 30:00 | 72 | 0.37 |
| 12:00 | 36 | 0.15 | 31:00 | 75 | 0.32 |
| 13:00 | 39 | 0.10 | 32:00 | 78 | 0.26 |
| 14:00 | 42 | 0.09 | 33:00 | 81 | 0.23 |
| 15:00 | 45 | 0.07 | 34:00 | 84 | 0.18 |
| 16:00 | 48 | 0.07 | 35:00 | 87 | 0.15 |
| 17:00 | 51 | 0.07 | 36:00 | 90 | 0.14 |

TABLE 14-continued

| Time | Drops | $O_2$ ppm | Time | Drops | $O_2$ ppm |
|---|---|---|---|---|---|
| 18:00 | 54 | 0.07 | | | |

*Aerating sample

EXAMPLE (Sample 42)

Another portion of the polymer base mud (Sample 42) was tested, aerated and treated with a 30% slurry of zinc hydrosulfite in white oil. The properties of Sample 42 are shown in Table 13. The zinc hydrosulfite was added dropwise at 3 drops per minute (one drop being 0.018484 gm of zinc hydrosulfite). The time in minutes, drops of slurry and oxygen concentration in ppm are tabulated as follows:

TABLE 15

| Time | Drops | $O_2$ ppm | Time | Drops | $O_2$ ppm |
|---|---|---|---|---|---|
| 0 | 0 | 8.20 | 18:00 | 54 | 0.11 |
| 1:00 | 3 | 8.20 | 19:00 | 57 | 0.10 |
| 2:00 | 6 | 8.07 | 20:00 | 60 | 0.10 |
| 3:00 | 9 | 7.80 | 21:00* | — | 2.00 |
| 4:00 | 12 | 7.48 | 22:00* | — | 3.85 |
| 5:00 | 15 | 7.03 | 23:00* | — | 5.20 |
| 6:00 | 18 | 6.45 | 24:00* | — | 4.70 |
| 7:00 | 21 | 5.78 | 25:00* | — | 4.30 |
| 8:00 | 24 | 5.00 | 26:00 | — | 4.00 |
| 9:00 | 27 | 4.20 | 27:00 | — | 1.40 |
| 10:00 | 30 | 3.35 | 28:00 | — | 0.90 |
| 11:00 | 33 | 2.55 | 29:00 | — | 0.57 |
| 12:00 | 36 | 1.65 | 30:00 | — | 0.46 |
| 13:00 | 39 | 0.75 | 31:00 | — | 0.43 |
| 14:00 | 42 | 0.30 | 32:00 | 63 | 0.37 |
| 15:00 | 45 | 0.20 | 33:00 | 66 | 0.35 |
| 16:00 | 48 | 0.15 | 34:00 | 69 | 0.31 |
| 17:00 | 51 | 0.14 | 35:00 | 72 | 0.38 |

*Aerating sample

EXAMPLE (Sample 43)

A third portion of polymer base mud (Sample 43) was tested, aerated and treated with a solution of 20 grams of sodium sulfite anhydrous, $Na_2SO_3$, per 100 ml of solution with deionized water. The properties of Sample 43 are in Table 13. The sodium sulfite solution was added at 3 and 5 drops per minutes with stirring as for the previous samples (one drop equals 0.0262415 gm of $Na_2SO_3$). The time in minutes, drops of solution and oxygen concentration in ppm are tabulated as follows:

TABLE 16

| Time | Drops | O₂ ppm | Time | Drops | O₂ ppm |
|---|---|---|---|---|---|
| 0 | 0 | 8.30 | 22:00 | 90 | 6.00 |
| 1:00 | 3 | 8.28 | 23:00 | 95 | 5.70 |
| 2:00 | 6 | 8.28 | 24:00 | 100 | 5.20 |
| 3:00 | 9 | 8.28 | 25:00 | 105 | 4.85 |
| 4:00 | 12 | 8.20 | 26:00 | 110 | 4.50 |
| 5:00 | 15 | 8.10 | 27:00 | 115 | 4.15 |
| 6:00 | 18 | 8.18 | 28:00 | 120 | 3.80 |
| 7:00 | 21 | 8.11 | 29:00 | 125 | 3.50 |
| 8:00 | 24 | 8.10 | 30:00 | 130 | 3.15 |
| 9:00 | 27 | 8.05 | 31:00 | 135 | 2.73 |
| 10:00 | 30 | 8.0 | 32:00 | 140 | 2.34 |
| 9:00 | 35 | 7.98 | 33:00 | 145 | 1.90 |
| 12:00 | 40 | 7.9 | 34:00 | 150 | 1.40 |
| 13:00 | 45 | 7.8 | 35:00 | 155 | 1.00 |
| 14:00 | 50 | 7.71 | 36:00 | 160 | 0.65 |
| 15:00 | 55 | 7.51 | 37:00 | 165 | 0.42 |
| 16:00 | 60 | 7.35 | 38:00 | 170 | 0.31 |
| 17:00 | 65 | 7.12 | 39:00 | 175 | 0.25 |
| 18:00 | 70 | 6.92 | 40:00 | 180 | 0.21 |
| 19:00 | 75 | 6.80 | 41:00 | 185 | 0.20 |
| 20:00 | 80 | 6.52 | 42:00 | 190 | 0.18 |
| 21:00 | 85 | 6.30 | 43:00 | 195 | 0.15 |
| 44:00 | 200 | 0.15 | 61:00 | 245 | 0.45 |
| 45:00 | 205 | 0.13 | 62:00 | 250 | 0.41 |
| 46:00 | 210 | 0.11 | 63:00 | 255 | 0.37 |
| 47:00 | 215 | 0.10 | 64:00 | 260 | 0.34 |
| 48:00 | 220 | 0.10 | 65:00 | 265 | 0.31 |
| 49:00 | 225 | 0.10 | 66:00 | 270 | 0.28 |
| 50:00 | 230 | 0.10 | 67:00 | 275 | 0.25 |
| 51:00* | — | 0.75 | 68:00 | 280 | 0.23 |
| 52:00* | — | 1.62 | 69:00 | 285 | 0.20 |
| 53:00* | — | 2.30 | 70:00 | 290 | 0.19 |
| 54:00* | — | 2.55 | 71:00 | 295 | 0.16 |
| 55:00* | — | 2.85 | 72:00 | 300 | 0.15 |
| 56:00 | — | 0.30 | 73:00 | 305 | 0.14 |
| 57:00 | — | 0.70 | 74:00 | 310 | 0.13 |
| 58:00 | — | 0.65 | 75:00 | 315 | 0.11 |
| 59:00 | 235 | 0.55 | 76:00 | 320 | 0.10 |
| 60:00 | 240 | 0.50 | | | |

*Aerating sample

From Samples 34–43 it is readily apparent that zinc hydrosulfite effectively removes both oxygen and hydrogen sulfide from drilling fluids without adversely affecting the rheology of the drilling fluid.

EXAMPLE (Samples 44–54)

Eleven portions (Samples 44–54) of No. 2 diesel oil were saturated with hydrogen sulfide ($H_2S$) by bubbling the hydrogen sulfide through the diesel for 1.5 hours. Into each sample a portion of a finely ground scavenger material was placed at a concentration of 10 gm per 350 ml of sample or 10 pounds per 42-gallon barrel (ppb). Each sample was sealed and stirred magnetically for 1.5 hours. The concentration of hydrogen sulfide in each sample was tested by use of a Wickhold combustion apparatus before and after addition of each scavenger material being tested. The hydrogen sulfide scavenger material and percent of hydrogen sulfide removed are tabulated as follows:

TABLE 17

| Sample | Scavenger Tested | Percent H₂S Removed |
|---|---|---|
| 44 | CaO | 9.2 |
| 45 | CaCO₃ | 32.9 |
| 46 | Ca(OH)₂ | 82.2 |
| 47 | Zn₂(OH)₂CO₃ | 84.2 |
| 48 | Zn₂(OH)₂CO₃ | 84.7 |
| 49 | ZnO | 31.8 |
| 50 | ZnSO₄ | 23.8 |
| 51 | Zn (dust) | 25.0 |
| 52 | Zn . NTS | 25.4 |
| 53 | Fe₃O₄ | 32.8 |
| 54 | Na₂SO₃ | 29.6 |

Zn . NTS is a zinc-nitrilotriacetic acid complex.

From Samples 44–54 it is readily apparent that basic zinc carbonate ($Zn_2(OH)_2CO_3$) and calcium hydroxide ($Ca(OH)_2$) effectively remove hydrogen sulfide from fluids in which the continuous or external phase is an organic liquid or an oil base mud.

I claim:

1. A method of removing sulfide ion from a fluid having a pH of about 5–12 comprising adding an organometallic zinc chelate formed from an organic chelating agent which is (1) a low molecular weight hydrocarbon base material containing acetic or nitrogen functional groups or (2) dithiotartaric acid and containing at least about 10% by weight zinc to said fluid in sufficient quantity to form zinc sulfide with the sulfide ion; mixing the chelate with the fluid and forming the zinc sulfide; and maintaining the organo zinc chelate concentration at a level to maintain the sulfide ion concentration below the desired level, wherein said organo zinc chelate has a stability constant of about 10–16 which prevents formation of zinc hydroxide up to pH values of about 10–11.

2. A method of claim 1 in which the fluid is an aqueous well fluid.

3. A method of claim 1 in which the fluid is a well fluid containing a hydrocarbon.

4. A method of claim 1 in which the fluid is in a sewage system.

5. A method of claim 1 in which the fluid is used for make-up fluid in a well.

6. A method of claim 1 in which the fluid is produced from a well.

7. The method of claim 1 wherein the chelating agent comprises at least one of B-mercaptoethyliminodiacetic acid; dithiotartaric acid; ethylene-bis-N,N'-2(aminomethyl)-pyridine-N-N'-diacetic acid; B,B',B''-triaminotriethylamine; N-hydroxy ethylethylene diamine triacetic acid; ethylene diamine-N,N'-dipropionic-N,N'-diacetic acid; triethylene tetramine; ethylene diamine-N, N-diacetic acid; ethylene-bis-alpha,alpha'-(2-aminomethyl)-pyridine; alpha,B-diamino propionic acid; ethylene diamine-N,N'diacetic acid or nitrilotriacetic acid.

8. The method of claim 1 wherein the chelating agent comprises dithiotartaric acid.

9. The method of claim 1 wherein the chelating agent comprises B,B',B''-triaminotriethylamine.

10. The method of claim 1 wherein the chelating agent comprises N-hydroxy ethylethylene diamine triacetic acid.

11. The method of claim 1 wherein the chelating agent comprises ethylene diamine-N,N'-dipropionic-N-N'-diacetic acid.

12. A method of inactivating ionizable sulfide in a well drilling fluid having a pH of about 5–12 without adversely affecting rheology of said fluid comprising adding to said fluid at least one component means for supplying zinc ion and an organic chelating agent which is (1) a low molecular weight hydrocarbon base material containing acetic or nitrogen functional groups or (2) dithiotartaric acid added in sufficient quantity to chelate said zinc ion until the zinc ion reacts with sulfide ion wherein said chelate contains at least about 10% by weight zinc; said chelating agent and zinc having a stability constant of about 10–16 which prevents formation of an insoluble zinc hydroxide and maintaining the concentration of said component means at a level sufficient to inactivate ionizable sulfide in said well fluid.

13. The method of claim 12 wherein the chelating agent comprises at least one of B-mercaptoethyliminodiacetic acid; dithiotartaric acid; ethylene-bis-N,N'-2(aminomethyl)-pyridine-N-N'-diacetic acid; B,B',B''-triaminotriethylamine; N-hydroxy ethylethylene diamine triacetic acid; ethylene diamine-N,N'-dipropionic N-N'-diacetic acid; TETA; ethylene diamine-N,N-diacetic acid; ethylene-bis-alpha, alpha'-(2 aminomethyl)-pyridine; alpha,B-diamino propionic acid; ethylene diamine-N,N'diacetic acid or nitrilotriacetic acid.

14. A method of removing sulfide ion from a fluid having a pH of about 5–12 comprising adding a soluble zinc compound and an organic chelating agent which is (1) a low molecular weight hydrocarbon base material containing acetic or nitrogen functional or (2) dithiotartaric acid in excess of the concentration of said zinc ion to said fluid to form an organo zinc chelate in situ having a stability constant of about 10–16 and at least about 10% by weight zinc; mixing said chelate with said fluid to form the zinc sulfide and maintaining the organo zinc chelate concentration at a level to maintain the sulfide ion concentration below the desired level, wherein said organo zinc chelate has a stability constant which prevents formation of zinc hydroxide up to pH values of about 10–11.

15. The method of claim 14 wherein the zinc compound is at least one compound of zinc having an anion which is acetate, sulfate, bromate, bromide, chlorate, chloride, formate, iodide, nitrate, silicofluoride, sulfoxylate or hydrosulfite.

16. In a process of scavenging sulfide ion from a fluid having a pH of about 5–12 by adding a sulfide scavenger to said fluid, the process characterized by use of a chelate of zinc ion with nitrilotriacetic acid, nitrilotriacetate salt or a mixture thereof containing at least 10% by weight zinc as the scavenger which does not significantly adversely affect rheology of the fluid in which the chelate has a stability constant of about 10–16 which prevents formation of zinc hydroxide at a pH below about 11.

* * * * *

UNITED STATES PATENT AND TRADEMARK OFFICE
CERTIFICATE OF CORRECTION

PATENT NO. : 4,252,655  Page 1 of 2

DATED : February 24, 1981

INVENTOR(S) : Leroy L. Carney

It is certified that error appears in the above–identified patent and that said Letters Patent are hereby corrected as shown below:

In Column 1, line 31, delete [froma] and insert therefor --from--.

In Column 2, line 11, between "Chaber" and "Martell" insert --and--.

In Column 4, line 57, delete [3,059,533] and insert therefor --4,059,533--.

In Column 5, line 54, delete [ppm] and insert therefor --ppb--.

In Column 9, Table 10, in the column headed "26" under subtitle "Aging," in the line entitled "$H_2S$ Remaining" delete [13] and insert therefor -- - --.

UNITED STATES PATENT AND TRADEMARK OFFICE
CERTIFICATE OF CORRECTION

PATENT NO. : 4,252,655

DATED : February 24, 1981

INVENTOR(S) : Leroy L. Carney

It is certified that error appears in the above-identified patent and that said Letters Patent are hereby corrected as shown below:

In Column 11, Table 13, in the column entitled "Sample 42" under subtitle "After Test," in the line entitled "Temp. °C." delete [23] and insert therefor --24.5--.

In Column 11, Table 13, in the column entitled "Sample 43" under subtitle "After Test," in the line entitled "Temp. °C." insert --23--.

Signed and Sealed this

Twenty-third Day of March 1982

|SEAL|

Attest:

GERALD J. MOSSINGHOFF

Attesting Officer     Commissioner of Patents and Trademarks